United States Patent [19]

Meyer

[11] Patent Number: 4,556,568
[45] Date of Patent: Dec. 3, 1985

[54] SALT SUBSTITUTE CONTAINING POTASSIUM CHLORIDE COATED WITH A MIXTURE INCLUDING MALTODEXTRIN AND POTASSIUM BITARTRATE AND METHOD OF PREPARATION

[75] Inventor: David R. Meyer, Chesterfield, Mo.

[73] Assignee: Mallinckrodt, Inc., St. Louis, Mo.

[21] Appl. No.: 509,848

[22] Filed: Jun. 30, 1983

[51] Int. Cl.$^4$ .............................................. A23L 1/237
[52] U.S. Cl. ..................................... 426/96; 426/302; 426/649; 426/804
[58] Field of Search .................. 426/649, 804, 96, 302

[56] References Cited

U.S. PATENT DOCUMENTS

| Re. 27,981 | 4/1974 | Frank et al. | 99/143 |
|---|---|---|---|
| 1,978,040 | 4/1933 | Daitz | 99/143 |
| 1,998,179 | 4/1935 | Wolf | 99/11 |
| 2,742,366 | 4/1956 | Power | 99/143 |
| 3,505,082 | 4/1970 | Miller | 99/143 |
| 3,560,343 | 2/1971 | Armbruster et al. | 195/31 |
| 3,663,369 | 5/1972 | Morehouse et al. | 195/31 |
| 3,773,526 | 11/1973 | Bliznak | 426/215 |
| 3,821,436 | 6/1974 | Fry | 426/213 |
| 3,849,194 | 11/1974 | Armbruster et al. | 127/29 |
| 3,860,732 | 1/1975 | Eisenstadt | 426/219 |
| 4,068,006 | 1/1978 | Moritz | 426/99 |
| 4,107,346 | 8/1978 | Kravitz | 426/648 |
| 4,176,201 | 11/1979 | Cook | 426/548 |
| 4,298,400 | 11/1981 | Armbruster | 127/29 |
| 4,340,614 | 7/1982 | Pich et al. | 426/649 |

FOREIGN PATENT DOCUMENTS

| 838060 | 3/1970 | Canada . |
|---|---|---|
| 1469089 | 3/1977 | United Kingdom . |
| 2080664 | 2/1982 | United Kingdom . |

OTHER PUBLICATIONS

"Maltrin ® Maltodextrins . . . Carbohydrate Profile", Grain Processing Corporation, Bulletin 9102, 9/82, 4 pages.

"Maltrin Maltodextrins & Corn Syrup Solids", Grain Processing Corporation, Bulletin 11011, 11/81, 7 pages.

"Maltrin M100 Maltodextrin", Grain Processing Corporation, Product Data Sheet 6011, 6/81, one page.

Primary Examiner—Raymond Jones
Assistant Examiner—Elizabeth A. King
Attorney, Agent, or Firm—Richard G. Jackson; Roy J. Klostermann; Lynden N. Goodwin

[57] ABSTRACT

A salt substitute composition is disclosed which includes coated particles, each particle comprising:
  (a) a core comprising potassium chloride and
  (b) a coating on the core, the coating including a mixture containing:
    (i) maltodextrin and
    (ii) cream of tartar (potassium bitartrate) and
    (iii) optionally, sodium chloride.

Also disclosed is a process for preparing a salt substitute composition which includes spraying an aqueous solution containing cream of tartar and maltodextrin (and sodium chloride, if included) onto an agitated and heated bed of particles including potassium chloride.

31 Claims, No Drawings

SALT SUBSTITUTE CONTAINING POTASSIUM CHLORIDE COATED WITH A MIXTURE INCLUDING MALTODEXTRIN AND POTASSIUM BITARTRATE AND METHOD OF PREPARATION

The present invention relates to a coated-particle composition useful as a substitute for salt.

There are a number of salt substitute compositions which are described in the literature and/or are available commercially containing potassium chloride with and without sodium chloride. Such compositions have been proposed for people who seek to eliminate or minimize the amount of sodium chloride in their diet due to medical necessity or for other reasons. However, the heretofore known salt substitutes have not been entirely satisfactory from the standpoints of similarity to common salt (i.e. sodium chloride) in taste and appearance. Accordingly, there is a substantial need in the art for an improved salt substitute composition.

In U.S. Patent Application of Alexis D. Bell, Ser. No. 509,844, filed concurrently herewith (June 30, 1983) under Attorney's Docket No. 0272 and assigned to the assignee hereof, there is described a salt substitute composition which comprises coated particles, each particle comprising:
(a) a core comprising potassium chloride and
(b) a coating on the core, the coating comprising a mixture containing
  (i) maltodextrin and
  (ii) sodium chloride,
wherein the dextrose equivalent (D.E.) of the combined amount of potassium chloride, maltodextrin and sodium chloride is not more than 10 D.E. units.

It has now been found unexpectedly that an effective salt substitute can be prepared by substituting a minor amount of cream of tartar for the sodium chloride in the composition of the Bell application. That is, it has now been found unexpectedly that a salt substitute composition including maltodextrin and cream of tartar can be prepared which at least closely approaches the taste and appearance of salt and substantially fulfills the above-mentioned need.

DESCRIPTION OF THE INVENTION

Generally stated, the present invention provides a salt substitute composition which comprises coated particles, each particle comprising:
(a) a core comprising potassium chloride and
(b) a coating on said core, said coating comprising a mixture containing:
  (i) maltodextrin and
  (ii) cream of tartar,
wherein the dextrose equivalent (D.E.) of the combined amount of potassium chloride, maltodextrin and cream of tartar is not more than 10 D.E. units.

In an embodiment, the above salt substitute composition of this invention may further include sodium chloride. In this embodiment, the D.E. of the combined amount of potassium chloride, maltodextrin, cream of tartar and sodium chloride is preferably not more than 10 D.E. units.

DETAILED DESCRIPTION OF THE INVENTION AND OF THE MANNER AND PROCESS OF MAKING AND USING IT

As used herein, the term "particle" includes extremely small pieces of matter and small agglomerates or clusters thereof. As used herein with reference to a material, the terms "dextrose equivalent" and "D.E." mean the total amount of reducing sugars (calculated as dextrose) in the material, which amount is expressed as a percent of the total weight (dry basis) of the material. Such percent is referred to herein as "D.C. units." (Reducing sugars include, e.g., all monosaccharides; maltose; cellobiose; and lactose. Sucrose is a non-reducing sugar.) The D.E. of a material consisting of two or more components can be calculated by multiplying the weight fraction ("w.f.") of each component of the material by the D.E. of such component and adding the resulting products of multiplication. For example, a material consisting of 20% (0.20 w.f.) component A having a D.E. of 10 D.E. units and 80% (0.80 w.f.) component B having a D.E. of zero has a D.E. of 2 ($0.20 \times 10 + 0.80 \times 0$) D.E. units.

The salt substitute of the present invention contains three essential components, as indicated above. In general, these components may be combined in any relative proportions in accordance with the teachings hereof to prepare a broad range of salt substitutes useful for a wide variety of end use applications, e.g., for table salt, inclusion in snack foods (e.g., pretzels, potato chips, corn chips, etc.), cereals, baked goods and other edible compositions such as those which heretofore have included common salt (i.e., sodium chloride) as ingredients thereof. In use, the salt substitutes of the present invention may be substituted in whole or in part for the common salt component of heretofore known edible compositions.

The salt substitute may include the three essential components (set forth above) in the below indicated amounts:
  potassium chloride: from about 91 to about 59%,
  maltodextrin: from about 1 to about 40%, and
  cream of tartar: from about 0.1 to about 0.9%,
  wherein the percentage amounts are by weight based on the combined weight of said ingredients.

As a general preference, the potassium chloride component is included in an amount from about 90 to about 69%, the maltodextrin component is included in an amount from about 10 to about 30%, and the cream of tartar component is included in an amount from about 0.1 to about 0.7%, wherein the percentage amounts are by weight based on the combined weight of the three essential components set forth above.

More preferably, the potassium chloride is included in an amount from about 85 to about 80%, the maltodextrin is included in an amount from about 15 to about 20%, and the cream of tartar is included in an amount from about 0.1 to about 0.5%, such percentages being by weight and on the aforesaid basis (i.e., the combined total weight of these three essential components being 100% by weight).

For human consumption of the salt-substitute compositions, all ingredients employed should be humanly edible, e.g., Food Chemical Codex grade.

The salt substitutes may be prepared from raw material ingredients having any suitable particle sizes. Preferably, the particle size of the potassium chloride employed is from about 20 to about 60 mesh (U.S. sieve size). Excellent tasting salt substitutes have also been prepared in accordance with the present invention employing food grade potassium chloride powder.

The particular size potassium chloride may be selected to meet any particular end use application. For example, where "pretzel grade" salt substitutes (i.e., plus 35 mesh US sieve size) are desired, potassium chloride having a particle size greater than 35 mesh may be advantageously employed as the starting material. Where "shaker grade" (i.e., minus 35 to plus 60 mesh) is desired for the salt substitute, potassium chloride having a particle size from minus 35 to plus 60 mesh may advantageously be employed as the potassium chloride starting material. Where a "popcorn grade" (i.e., minus 60 mesh) size salt substitute is desired, the potassium chloride starting material may advantageously have a particle size of minus 60 mesh.

Inasmuch as the herein preferred process for preparing the coated particulate salt substitutes may result in formation of some agglomerates or clusters of smaller particles, the as-prepared salt substitutes may have a broad particle size distribution. For some end uses, it has been found advantageous to size classify such salt substitutes to obtain more desirable particle size distributions for such uses.

When prepared in accordance with the preferred preparation process therefor, the salt substitutes of the present invention are generally found to have, in the as-produced (i.e., non-crushed state), the following coating coverage expressed as approximate percent of the surface area (S.A.) of the KCl-containing core:

Pretzel grade: at least substantially 100% S.A.
Shaker grade: about 90 to about 95% S.A.
Fines: about 80 to about 85%

The as-produced salt substitutes may be used as is (with or without size classification) or, if desired, may be be subjected to size reduction (e.g., crushing) prior to use. Size reduction is advantageously employed where some of the particles or agglomerates formed in the as-produced state are oversize (i.e., larger than desired for a given end use). For example, as produced pretzel grade salt substitute particles may be crushed to form smaller salt substitute particles. When as-produced pretzel grade salt substitute particles were crushed to form shaker grade (i.e., minus 35 to plus 60 mesh) salt substitute particles, the latter were found to have from about 90 to about 95% of the surface area of the KCl-containing core coated with the maltodextrin/cream of tartar coating mixture. Salt-substitute fines (i.e., particles having a particle size of less than 60 mesh prepared by crusing larger as-produced particles of the salt-substitute have been found to have from about 60 to about 70% of the surface area of the KCl-containing core coated with the maltodextrin/cream of tartar coating mixture. Surprisingly, fines prepared by such crushing have been found to taste nearly as good as fines prepared directly, i.e., without crushing.

Any suitable maltodextrin may be employed as the maltodextrin component. The maltodextrin employed is preferably a water-soluble maltodextrin having at least a major portion (e.g., slightly more than 50%, preferably about 60% or more) of one or more polysaccharides having a D.P. (i.e., degree of polymerization) of at least 10. More preferably, the maltodextrin employed is additionally a starch hydrolyzate of low sweetness having a low dextrose equivalent value of from about 5 to about 20 more preferably about 5 to about 15) D.E. units, high water solubility with substantial freedom from haze and low hygroscopicity. The most preferred maltodextrin employed herein is that commercially available from Grain Processing Corporation (GPC), Muscatine, Iowa, under the designation MALTRIN® M100 maltodextrin. According to the "Typical Analysis" in GPC Bulletin 11011 entitled MALTRIN Maltodextrins & Corn Syrup Solids, M100 maltodextrin has a D.E. of about 9-12 D.E. units and a "Carbohydrate Composition, % (db)" as follows: dextrose (1.0), disaccharides (4.0), trisaccharides (6.0) and "tetrasaccharides & higher" (89.0). According to GPC Product Data Sheet 6011 for MALTRIN M100 maltodextrin, the M100 has a "Typical Carbohydrate Profile (dry basis) in % as follows: monosaccharides (1%), disaccharides (4%), trisaccharides (6%), tetrasaccharides (5%) and "pentasaccharides & above" (84%).

According to GPC Bulletin 9102 relating to "Carbohydrate Profile" of MALTRIN maltodextrins and corn syrup solids, M100 maltodextrin has the following "Typical Carbohydrate Profile":

| Saccharides-by Degree of Polymerization | Amount % Average | Range |
| --- | --- | --- |
| DP1 | 0.5 | 0.3–0.8 |
| DP2 | 2.7 | 2.3–2.9 |
| DP3 | 4.3 | 4.2–5.0 |
| DP4 | 3.7 | 3.3–4.1 |
| DP5 | 3.1 | 2.7–3.4 |
| DP6 | 5.0 | 0.7–6.0 |
| DP7 | 7.1 | 6.5–8.3 |
| DP8 | 4.5 | 4.2–5.3 |
| DP9 | 3.1 | 2.8–3.6 |
| DP10 | 1.6 | 0.6–2.9 |
| Above DP10 | 64.4 | 56.8–68.1 |

The above GPC bulletins and data sheet are incorporated herein by reference.

Maltodextrins suitable for use herein may be prepared, for example, in accordance with the methods disclosed in U.S. Pat. Nos. 3,560,343; 3,663,369; 3,849,194; and 4,298,400. These patents are incorporated herein by reference.

Cream of tartar suitably included herein is commercially available from McCormick & Co. (Baltimore, Md.). In general, cream of tartar is preferably included in an amount of about 0.33%.

Advantageously, salt-substitute compositions of the present invention can be made as "salt-free" (i.e., free of sodium chloride) salt substitutes having highly suitable taste. Alternatively, in embodiments of the invention sodium chloride can be included in the salt-substitute particles, preferably in the coating mixture. In such embodiments sodium chloride can be included in any effective amount. The amounts of the components in these embodiments may be, for example:

potassium chloride: from about 91 to about 19%,
maltodextrin: from about 1 to about 40%, and
cream of tartar: from about 0.1 to about 0.9%,
sodium chloride: up to about 50% wherein the percentage amounts are by weight based on the combined weight of said components.

As a general preference, the potassium chloride component is included in an amount from about 91 to about 19%, the maltodextrin component is included in an amount from about 10 to about 30%, the cream of tartar component is included in an amount from about 0.1 to about 0.7%, and the sodium chloride component is included in an amount from about 0.1% to about 50% wherein the percentage amounts are by weight based on the combined weight of the four components set forth above.

More preferably, the potassium chloride is included in an amount from about 85 to about 65%, the maltodextrin is included in an amount from about 15 to about 20%, the cream of tartar is included in an amount from about 0.1 to about 0.5%, and the sodium chloride is included in an amount from about 0.1 to about 15%, such percentages being by weight and on the aforesaid basis (i.e., the combined total weight of these four components being 100% by weight).

The salt substitutes of the present invention may be prepared, for example, by spraying an aqueous solution containing maltodextrin and cream of tartar (and, optionally, sodium chloride) onto an agitated bed of crystalline potassium chloride. The aqueous solution may contain any suitable concentrations of maltodextrin and cream of tartar (and of sodium chloride where included) and may be employed in any suitable amount relative to the amount of potassium chloride being coated such that the dextrose equivalent of the resulting coated composition is not more than 10 D.E. units. As a general preference, the solution is a relatively dilute mixture (containing the maltodextrin in an amount of, for example, from about 25% to about 37%, based on the combined weight of the maltodextrin and water).

Practice of the present invention is illustrated by the following nonlimiting examples. All parts and percentages given throughout this disclosure including the examples and claims appended hereto, are by weight unless otherwise indicated.

Unless otherwise indicated, the taste panel results set forth in the examples resulted from the following taste test procedure. Each panelist touched his tongue sequentially to each taste sample, which was supported on a clean paper napkin, made his taste evaluation, and rinsed his mouth with water prior to so tasting each sample. Each panel included at least three panelists. The evaluation or rating system is set forth herein below.

EXAMPLE 1

A composition of this invention containing potassium chloride, maltodextrin ("MD") and cream of tartar ("CT") was prepared in this example.

Maltodextrin M100 (Grain Processing Corporation), 20 parts, and cream of tartar (McCormick & Co.), 0.33 parts, were added with stirring to about 60 parts of water to form an aqueous coating mixture or solution containing about 25% maltodextrin M100 and about 0.41% cream of tartar, balance water such % amounts based on the combined weight of MD and water. Stirring was continued until a substantially uniform solution having substantial freedom from haze was formed.

To a Hobart Model No. N-50 blender equipped with an electrical heater, an insulation jacket and an agitator was added 79.67 parts of potassium chloride (Code 6307-granular, Mallinckrodt, Inc.). The resulting particulate bed of potassium chloride granules or crystals was agitated and heated to 120° C. and thereafter the aqueous solution containing maltodextrin and cream of tartar was slowly sprayed onto the bed while continuing agitation thereof. Spraying was effected at a rate such that the temperature of the agitated KCl-containing bed was maintained at approximately 120° C. throughout the spraying operation to effect continual removal of the resulting water vapor.

After all the solution had been sprayed onto the agitated bed, agitation was continued for about 15 minutes to effect removal of additional water vapor. Thereafter, the resulting substantially dry, free-flowing salt substitute containing potassium chloride particles coated with the maltodextrin and cream of tartar was recovered and separated into three size classes using 60 mesh and 35 mesh screens (U.S. Standard Sieves). A sample of each size class of the recovered salt substitute was analyzed by photo-microscopy using 7-100x magnification and phase contrast illumination.

Visual inspection of the photomicrographs showed the following approximate average surface area coating:

plus 35 mesh ("pretzel grade") substantially 100%
minus 35 to plus 60 mesh ("shaker grade") about 90 to about 95%
minus 60 mesh ("fines" or "popcorn grade") about 80 to about 85%

Visual observation (without magnification) of particles in each of the above three size classes showed that the salt substitute was substantially identical in appearance to sodium chloride of like size. Moreover, the size classes of each of the above salt substitutes were found to be substantially free-flowing and substantially nonhygroscopic. Samples of the shaker grade composition were subjected to a taste test for evaluation. Samples of comparative materials were included in the test. Results of the test are set forth in Table I.

TABLE I
TASTE PANEL RESULTS

| Source of Taste Sample | Taste Characteristics (a) | | | | |
|---|---|---|---|---|---|
| | Saltiness | Bitter-Metallic | Cooling | Aftertaste | Sweetness |
| (I) Invention | | | | | |
| Example 1 | 1.67 | 1.17 | 0.42 | 0.63 | 0.83 |
| KCl 79.67% (Core) | | | | | |
| MD 20% (Coating) | | | | | |
| CT 0.33% (Coating) | | | | | |
| (II) Comparative Materials | | | | | |
| Sodium Chloride (b) | 1 | 0 | 0 | 0.5 | 0 |
| Potassium Chloride (c) | 1.33 | 2.33 | 2.5 | 2.33 | 0 |
| Cumberland Nu Salt (d) | 1.42 | 2.0 | 1.67 | 1.92 | 1.5 |
| Norcliff T No Salt (e) | 1 | 2.5 | 2.5 | 2.5 | 0 |
| L.S. Salt-Free (f) | 2.17 | 0.33 | 0.92 | 3.67 | 0.67 |
| Adolph's Salt-Sub (g) | 2.0 | 2.92 | 2.5 | 3.0 | 0 |
| Feather. Salt-Sub (h) | 1.33 | 1.5 | 2.17 | 1.92 | 0.5 |
| M.S. Salt-Sub (i) | 1.58 | 2.17 | 1.83 | 2.56 | 0.17 |
| "KCl Flo-Free Plus" (j) | 1.17 | 3.0 | 1.67 | 2.58 | 1.0 |

(a) Each numerical result for each characteristic is the arithmetic average of each panelist's numerical rating made in accordance with the rating system set forth in Table II.
(b) "Morton Blue Can", Morton Salt Co. (Div. of Morton-Norwick Products, Inc.), Chicago, Illinois.
(c) "6307 - Granular", Mallinckrodt, Inc., St. Louis, Missouri.
(d) ("Sweet 'N Low Nu-Salt" Cumberland Packing Corp., Brooklyn, NY) Approximate Analysis: 84% KCl, 15% dextrose, 0.08% "CT" (cream of tartar), 0.7% insoluble matter, 1.5% water. Represented as containing less than 10 mg of sodium per 100 g.
(e) ("No Salt" - Norcliff Thayer, Inc., Tuckahoe, NY) Represented as containing KCl, potassium bitartrate, potassium glutamate, adipic acid, fumaric acid, polyethylene glycol 400, disodium inosinate and less than 10 mg of sodium per 100 g.
(f) ("Lawry's Seasoned Salt-Free" - Lawry's Foods, Inc., Los Angeles, California.) Represented as containing KCl, dextrose, spices (including paprika and turmeric), onion, garlic, tricalcium phosphate, corn starch, disodium inosinate, disodium guanylate, potassium bitartrate, natural flavor and less than 180 mg of sodium and 10,440 mg potassium per 100 g.
(g) ("Adolph's Salt Substitute" - Adolph's Ltd., N. Hollywood, California.) Represented as containing KCl (97.1%), silicon dioxide, tartaric acid and less than 10 mg of sodium per 100 g.
(h) ("Featherweight 'K' Salt Substitute" - Chicago Dietetic Supply, Inc., LaGrange, Illinois.) Represented as containing KCl, glutamic acid, potassium glutamate, tricalcium phosphate and less than 5 mg of sodium and 45 mg of potassium per 100 g.
(i) ("Morton Seasoned Salt Substitute" - Morton Salt Co., Chicago, Illinois.) Represented as containing KCl, spices, sugar, fumaric acid, tricalcium phosphate, monocalcium phosphate and less than 20 mg of sodium per 100 g.
(j) ("Potassium Chloride FCC Flo-Free Plus" - American International Chemical, Inc., Natick, Mass.) Represented as containing KCl (96%), silicon dioxide, monoammonium glutamate, malic acid and tri-calcium phosphate.

TABLE II

RATING SYSTEM

| Meaning of Numerical Rating | Related Taste Characteristic | |
|---|---|---|
| | Saltiness | All others |
| 0 | Saltier than salt | None |
| 1 | High salt-like taste | Low |
| 2 | Medium salt-like taste | Medium |
| 3 | Low salt-like taste | High |
| 4 | No salt-like taste | Overwhelming |

EXAMPLES 2 AND 3

Compositions of this invention containing potassium chloride, maltodextrin ("MD"), cream of tartar ("CT") and sodium chloride were prepared in these examples. The preparation procedure of Example 1 was repeated in each of these examples except as follows: In Example 2, sodium chloride (4 parts) was additionally added with the MD and CT to form the coating mixture or solution and the amount of potassium chloride employed was 75.67 parts. In Example 3, sodium chloride (15 parts) was additionally added with the MD and CT and the amount of potassium chloride employed was 64.67 parts. In each of these examples, the amount of water employed in the coating mixture was such that the concentration of MD therein was about 25–30% based on the total weight of MD and water.

The approximate amounts of the components of the compositions of Examples 2 and 3 are set forth below:

| Components | Approximate Amount of Components (%) | |
|---|---|---|
| | Ex. 2 | Ex. 3 |
| Potassium chloride | 76 | 65 |
| Maltodextrin ("MD") | 20 | 20 |
| Cream of Tartar ("CT") | 0.33 | 0.33 |
| Sodium Chloride | 4 | 15 |

The results of visual inspection with respect to appearance relative to the appearance of sodium chloride were substantially the same for Examples 2 and 3 as for Example 1 above. Samples of the shaker grade portion of each of the compositions of Example 2 and Example 3 were subjected to a taste test for evaluation. Samples of comparative materials were included in each test. Taste panel itemized evaluations by taste category for Example 2 and Example 3 appear in Table III and Table IV, respectively, along with evaluations for the comparative materials.

TABLE III

TASTE PANEL RESULTS

| Source of Taste Sample | Taste Characteristics (a) | | | | |
|---|---|---|---|---|---|
| | Salti-ness | Bitter-Metal-lic | Cool-ing | After-taste | Sweet-ness |
| (I) Invention | | | | | |
| Example 2 KCl 75.67% (Core) MD 20% (Coating) CT 0.33% (Coating) NaCl 4% (Coating) | 1.33 | 1.17 | 0.75 | 1.17 | 0.67 |
| (II) Comparative Materials | | | | | |
| "Nu Salt" (b) (Cumberland Packing Corp.) | 1.08 | 2.17 | 2.0 | 1.67 | 1.0 |
| Coated KCl-Containing Composition (c) 75% KCl (Core) 20% MD (Coating) 5% NaCl (Coating) | 1.58 | 1.67 | 0.92 | 1.67 | 0.5 |
| Coated KCl-Containing Composition (d) 72% KCl (Core) 20% MD (Coating) 8% NaCl (Coating) | 1.25 | 0.75 | 0.58 | 1.08 | 1.33 |
| Sodium Chloride (Morton) | 1.0 | 0 | 0 | 0.67 | 0 |

(a) Each numerical result for each characteristic is the arithmetic average of each panelist's numerical rating made in accordance with the rating system set forth in Table II.
(b) Approximate analysis: 84% KCl, 15% dextrose, 0.08 "CT" (Cream of Tartar), 0.7% insoluble matter, 1.5% water.
(c) Prepared by spraying an aqueous solution containing 20 parts MALTRIN ® M100 maltodextrin ("MD"), 5 parts NaCl and approximately 60 parts water onto an agitated bed of KCl (Code 6307 - granular, Mallinckrodt, Inc.), 75 parts, maintained about 120° C. and continuing agitation at such temperature until the resulting coated particles were substantially dry.
(d) Prepared as in note (c), except with different amounts of KCl and NaCl.

TABLE IV

TASTE PANEL RESULTS

| Source of Taste Sample | Taste Characteristics (a) | | | | |
|---|---|---|---|---|---|
| | Salti-ness | Bitter-Metal-lic | Cool-ing | After-taste | Sweet-ness |
| (I) Invention | | | | | |
| Example 3 KCl 64.67% (Core) MD 20% (Coating) CT 0.33% (Coating) NaCl 15% (Coating) | 1.13 | 0.75 | 0.5 | 0.5 | 1.38 |
| (II) Comparative Materials | | | | | |
| 20% NaCl + 80% KCl (b) | 1.0 | 3.0 | 3.0 | 3.0 | 0 |
| 50% NaCl + 50% KCl (b) | 1.13 | 2.75 | 1.75 | 2.25 | 0 |
| "Lite Salt" (c) (Morton Salt Co.) | 1.25 | 2.75 | 1.75 | 3.0 | 0 |
| Coated KCl-Containing Composition (d) 65% KCl (Core) 20% MD (Coating) 15% NaCl (Coating) | 1.25 | 0.63 | 0.63 | 0.63 | 1.0 |
| Sodium Chloride ("7851 - Granular," Mallinckrodt, Inc.) | 1.0 | 0 | 0 | 0 | 0 |

(a) Each numerical result for each characteristic is the arithmetic average of each panelist's numerical rating made in accordance with the rating system set forth in Table II.
(b) 2-component mixtures within numerical range disclosed in Frank et al., U.S. Pat. Nos. 3,514,296 and Re. 27,981, each prepared by thoroughly admixing granular NaCl and granular KCl in the indicated proportions until a homogeneous product was attained.
(c) Analysis: 49.5% NaCl, 49.5% KCl, 1% other (including calcium silicate, magnesium carbonate, dextrose and potassium iodide.
(d) Prepared by spraying an aqueous solution containing 20 parts MALTRIN ® M100 maltodextrin ("MD"), 15 parts NaCl and approximately 60 parts water onto an agitated bed of KCl (Code 6307 - granular, Mallinckrodt, Inc.), 65 parts, maintained about 120° C. and continuing agitation at such temperature until the resulting coated particles were substantially dry.

As shown by the taste panel results in Table I, Table III and Table IV, the salt substitutes of the present invention, as illustrated by Examples 1–3, have been found to closely approach the taste of common salt (sodium chloride) and more closely approach such taste than the other comparative materials set forth therein in at least one taste characteristic.

It is recognized that different end users may desire different levels of sodium chloride, and accordingly the best salt-substitute composition embodying this invention will depend on the desires of a given end user.

In general, however, regarding "salt-free" compositions, the salt substitute set forth in Example 1 is contemplated to be the best embodiment of this invention; regarding NaCl-containing compositions, the salt substitute set forth in Example 2 above is contemplated to be the best embodiment from the standpoint of commercial attractiveness, while the composition set forth below is contemplated to be the best embodiment for overall taste appeal:

|  | Approximate Amount |
|---|---|
| Core |  |
| potassium chloride | 71.67% |
| Coating Mixture |  |
| maltodextrin M100 | 20% |
| cream of tartar | 0.33% |
| sodium chloride | 8% |

It is contemplated that carrying out production of large-scale (e.g., commercial-size) quantities of the salt substitute of the present invention can best be effected using fluidized-bed fluidization for agitation of the potassium chloride particles, with a flow of warm air to remove the water vapor formed in the bed.

BEST MODE CONTEMPLATED

The best mode contemplated for carrying out this invention has been set forth in the above description, for example, by way of setting forth preferred materials and operating conditions, including but not limited to preferred ranges and values of amounts and other non-obvious variables material to successfully practicing the invention in the best way contemplated at the time of executing this patent application.

It is understood that the foregoing detailed description is given merely by way of illustration and that many modifications may be made therein without departing from the spirit or scope of the present invention.

What is claimed is:

1. A salt substitute composition which comprises coated particles, each particle comprising:
   (a) a core comprising potassium chloride and
   (b) a coating on said core, said coating comprising a mixture comprising:
      (i) maltodextrin and
      (ii) cream of tartar,
wherein the dextrose equivalent (D.E.) value of the combined amount of potassium chloride, maltodextrin and cream of tartar is not more than 10 D.E. units and the potassium chloride is present in an amount from about 91 to about 59%, the maltodextrin is present in an amount from about 1 to about 40%, and the cream of tartar is present in an amount from about 0.1 to about 0.9%, wherein the percentage amounts are by weight based on the weight of said combined amount.

2. The composition of claim 1 wherein the amount of potassium chloride is from about 90 to about 69%, the amount of maltodextrin is from about 10 to about 30% and the amount of cream of tartar is from about 0.1 to about 0.7%.

3. The composition of claim 2 wherein the amount of potassium chloride is about 79.67%, the amount of maltodextrin is about 20%, and the amount of cream of tartar is about 0.33%.

4. The composition of claim 1 wherein at least 60% of the surface area of said core is coated with said coating.

5. The composition of claim 4 wherein at least 80% of said surface area is coated.

6. The composition of claim 1 wherein the composition is free of sodium chloride.

7. The composition of claim 1 wherein said maltodextrin is a water-soluble maltodextrin including as at least a major portion thereof one or more polysaccharides having a degree of polymerization (D.P.) of at least 10.

8. The composition of claim 7 wherein said maltodextrin is a starch hydrolyzate having a low dextrose equivalent (D.E.) value of from about 5 to about 20 D.E. units.

9. The composition of claim 8 wherein said maltodextrin has a D.E. in the range from about 5 to about 15 D.E. units.

10. The composition of claim 9 wherein said range is from about 9 to about 12 D.E. units.

11. The composition of claim 10 wherein said maltodextrin has the following saccharide content as determined by high performance liquid chromatography:

| Saccharides - by Degree | Amount | |
| of Polymerization | From About (%) | To About (%) |
|---|---|---|
| DP1 | 0.3 | 0.8 |
| DP2 | 2.3 | 2.9 |
| DP3 | 4.2 | 5.0 |
| DP4 | 3.3 | 4.1 |
| DP5 | 2.7 | 3.4 |
| DP6 | 0.7 | 6.0 |
| DP7 | 6.5 | 8.3 |
| DP8 | 4.2 | 5.3 |
| DP9 | 2.8 | 3.6 |
| DP10 | 0.6 | 2.9 |
| DP (higher than 10) | 57 | 68 |

12. The composition of claim 11 wherein said saccharide content is as follows:

| Saccharides - by Degree of Polymerization | Amount (%) |
|---|---|
| DP1 | about 0.5 |
| DP2 | about 2.7 |
| DP3 | about 4.3 |
| DP4 | about 3.7 |
| DP5 | about 3.1 |
| DP6 | about 5.0 |
| DP7 | about 7.1 |
| DP8 | about 4.5 |
| DP9 | about 3.1 |
| DP10 | about 1.6 |
| DP (higher than 10) | about 64 |

13. The composition of claim 1 wherein said maltodextrin has a dextrose equivalent (D.E.) value of from about 5 to about 20 D.E. units.

14. A salt substitute composition which comprises coated particles, each particle comprising:
   (a) a core comprising potassium chloride and
   (b) a coating on said core, said coating comprising a mixture containing:
      (i) maltodextrin,
      (ii) cream of tartar and
      (iii) sodium chloride,
wherein the dextrose equivalent (D.E.) value of the combined amount of potassium chloride, maltodextrin, cream of tartar and sodium chloride is not more than 10 D.E. units and the potassium chloride is present in an amount from about 91 to about 19%, the maltodextrin is present in an amount from about 1 to about 40%, the cream of tartar is present in an amount from about 0.1 to about 0.9% and the sodium chloride is present in an amount up to about 50%; wherein the percentage amounts are by weight based on the weight of said combined amount.

15. The composition of claim 14 wherein the amount of potassium chloride is from about 91 to about 29%, the amount of maltodextrin is from about 10 to about 30%, the amount of cream of tartar is from about 0.1 to about 0.7% and the amount of sodium chloride is from about 0.1 to about 50%.

16. The composition of claim 15 wherein the amount of potassium chloride is about 75.67%, the amount of maltodextrin is about 20%, the amount of cream of tartar is about 0.33% and the amount of sodium chloride is about 4%.

17. The composition of claim 15 wherein the amount of potassium chloride is about 75.67%, the amount of maltodextrin is about 20%, the amount of cream of tartar is about 0.33% and the amount of sodium chloride is about 8%.

18. The composition of claim 14 wherein said maltodextrin is a water-soluble maltodextrin including as at least a major portion thereof one or more polysaccharides having a degree of polymerization (D.P.) of at least 10.

19. The composition of claim 18 wherein said maltodextrin is a starch hydrolyzate having a low dextrose equivalent (D.E.) value of from about 5 to about 20 D.E. units.

20. The composition of claim 19 wherein said maltodextrin has a D.E. in the range from about 5 to about 15 D.E. units.

21. The composition of claim 20 wherein said range is from about 9 to about 12 D.E. units.

22. The composition of claim 21 wherein said maltodextrin has the following saccharide content as determined by high performance liquid chromatography:

| Saccharides - by Degree of Polymerization | Amount | |
|---|---|---|
| | From About (%) | To About (%) |
| DP1 | 0.3 | 0.8 |
| DP2 | 2.3 | 2.9 |
| DP3 | 4.2 | 5.0 |
| DP4 | 3.3 | 4.1 |
| DP5 | 2.7 | 3.4 |
| DP6 | 0.7 | 6.0 |
| DP7 | 6.5 | 8.3 |
| DP8 | 4.2 | 5.3 |
| DP9 | 2.8 | 3.6 |
| DP10 | 0.6 | 2.9 |
| DP (higher than 10) | 57 | 68 |

23. The composition of claim 22 wherein said saccharide content is as follows:

| Saccharides - by Degree of Polymerization | Amount (%) |
|---|---|
| DP1 | about 0.5 |
| DP2 | about 2.7 |
| DP3 | about 4.3 |
| DP4 | about 3.7 |
| DP5 | about 3.1 |
| DP6 | about 5.0 |
| DP7 | about 7.1 |
| DP8 | about 4.5 |
| DP9 | about 3.1 |
| DP10 | about 1.6 |
| DP (higher than 10) | about 64 |

24. The composition of claim 23 wherein at least 60% of the surface area of said core is coated with said coating.

25. The composition of claim 24 wherein at least 80% of said surface area is coated.

26. The composition of claim 14 wherein the amount of sodium chloride is from about 0.1 to about 50%.

27. The composition of claim 14 wherein said maltodextrin has a dextrose equivalent (D.E.) value of from about 5 to about 20 D.E. units.

28. A process for preparing a salt-substitute composition, said process comprising as steps thereof:
   (A) providing a bed of particles comprising crystalline potassium chloride;
   (B) agitating said bed and heating said bed to a temperature of from about 120° to about 140° C.;
   (C) spraying an aqueous solution containing maltodextrin and cream of tartar onto said bed while maintaining said bed under agitation and at said temperature;
   (D) removing, from said bed, water vapor formed therein during said spraying step; and
   (E) recovering a coated-particle salt-substitute composition, each particle comprising:
      (1) a core comprising potassium chloride and
      (2) a coating on said core, said coating comprising a mixture containing;
         (i) maltodextrin and
         (ii) cream of tartar, and wherein the amount of potassium chloride in said bed and the amounts of maltodextrin and cream of tartar contained in said solution are such that (a) the amount of potassium chloride in said core is from about 91 to about 59%, the amount of maltodextrin contained in said mixture is from about 1 to about 40% and the amount of cream of tartar contained in said mixture is from about 0.1 to about 0.9%, the percentage amounts being by weight based on the combined amount of potassium chloride in said core, maltodextrin in said mixture and cream of tartar in said mixture, and (b) the dextrose equivalent (D.E.) value of said combined amount is not more than 10 D.E. units.

29. The process of claim 28 wherein said aqueous solution further includes sodium chloride, whereby said mixture further includes sodium chloride, and wherein the amount of potassium chloride in said bed and the amounts of maltodextrin, cream of tartar and sodium chloride contained in said solution are such that (a) the amount of potassium chloride in said core is from about 91 to about 19%, the amount of maltodextrin contained in said mixture is from about 1 to about 40%, the amount of cream of tartar contained in said mixture is from about 0.1 to about 0.9% and the amount of sodium chloride contained in said mixture is up to about 50%, the percentage amounts being by weight based on the combined amount of potassium chloride in said core, maltodextrin in said mixture, cream of tartar in said mixture and sodium chloride in said mixture, and (b) the dextrose equivalent (D.E.) value of said combined amount is not more than 10 D.E. units.

30. The process of claim 29 wherein the amount of sodium chloride contained in said solution is such that the amount of sodium chloride contained in said mixture is from about 0.1 to about 50%.

31. The process of claim 28 wherein said maltodextrin has a dextrose equivalent (D.E.) value of from about 5 to about 20 D.E. units.

* * * * *